(12) United States Patent
Tratzky et al.

(10) Patent No.: US 12,522,532 B2
(45) Date of Patent: Jan. 13, 2026

(54) GLASS TUBE FOR PHARMACEUTICAL CONTAINERS AND PROCESS FOR THE PRODUCTION OF A GLASS TUBE

(71) Applicant: SCHOTT AG, Mainz (DE)

(72) Inventors: Stephan Tratzky, Neustadt/Wn. (DE); André Witzmann, Waldershof (DE); Volker Trinks, Mitterteich (DE)

(73) Assignee: SCHOTT AG, Mainz (DE)

( * ) Notice: Subject to any disclaimer, the term of this patent is extended or adjusted under 35 U.S.C. 154(b) by 523 days.

(21) Appl. No.: 18/059,979

(22) Filed: Nov. 29, 2022

(65) Prior Publication Data

US 2023/0167013 A1 Jun. 1, 2023

(30) Foreign Application Priority Data

Nov. 29, 2021 (EP) ...................................... 21211119

(51) Int. Cl.
| | |
|---|---|
| *C03C 4/20* | (2006.01) |
| *A61J 1/06* | (2006.01) |
| *A61J 1/14* | (2023.01) |
| *C03C 3/091* | (2006.01) |

(52) U.S. Cl.
CPC ............... *C03C 4/20* (2013.01); *A61J 1/1468* (2015.05); *C03C 3/091* (2013.01); *C03C 2203/50* (2013.01)

(58) Field of Classification Search
CPC .......... C03C 4/20; C03B 17/04; A61J 1/1468; F16L 9/105; B07C 5/342
See application file for complete search history.

(56) References Cited

U.S. PATENT DOCUMENTS

| | | | |
|---|---|---|---|
| 2004/0025539 | A1 | 2/2004 | Witzmann |
| 2004/0129026 | A1 | 7/2004 | Bartsch |
| 2004/0176237 | A1* | 9/2004 | Ott ......................... C03C 3/091 |
| | | | 501/66 |
| 2007/0197366 | A1* | 8/2007 | Aoki ....................... C03C 13/00 |
| | | | 65/134.5 |
| 2014/0323287 | A1 | 10/2014 | Tratzky |
| 2016/0009586 | A1 | 1/2016 | Bookbinder |
| 2016/0107924 | A1 | 4/2016 | Yamamoto |
| 2016/0272527 | A1 | 9/2016 | Moseler |
| 2019/0322565 | A1 | 10/2019 | Witzmann |
| 2021/0347670 | A1 | 11/2021 | Lenz |

FOREIGN PATENT DOCUMENTS

| | | |
|---|---|---|
| DE | 10047850 A1 | 4/2002 |
| DE | 102011053635 | 3/2013 |

OTHER PUBLICATIONS

DIN ISO 7884-2:1998-2, "Glass—Viscosity and viscometric fixed points—Part 2: Determination of viscosity by rotation viscometers", First Edition Dec. 15, 1987, 12 pages.
ISO 4802-2:2010, "Glassware—Hydrolytic resistance of the interior surfaces of glass containers—Part 2: Determination by flame spectrometry and classification", Apr. 1, 2010 (Apr. 1, 2010), pp. 1-13.

* cited by examiner

*Primary Examiner* — Laura A Auer
(74) *Attorney, Agent, or Firm* — Ruggiero McAllister & McMahon LLC

(57) ABSTRACT

A glass tube for pharmaceutical containers and a process for the production of a glass tube are provided. The glass tubes have low alkali leachability and are devoid of a lamp ring.

21 Claims, 4 Drawing Sheets

GLASS TUBE FOR PHARMACEUTICAL CONTAINERS AND PROCESS FOR THE PRODUCTION OF A GLASS TUBE

CROSS REFERENCE TO RELATED APPLICATIONS

This application claims benefit under 35 USC § 119 of European Application 21211119.9 filed Nov. 29, 2021, the entire contents of which are incorporated herein by reference.

BACKGROUND

1. Field of the Invention

The invention relates to a glass tube for pharmaceutical containers and a process for the production of a glass tube. The glass tube is characterized by a low alkali leachability and is devoid of a lamp ring.

2. Description of Related Art

Glass tubes for pharmaceutical containers are known and widely encountered in the medical arena.

A typical process for the production of a glass tube for pharmaceutical containers involves a glass melt which is formed into a glass tube, for example by drawing. The formed glass tube is cut into larger portions which have two open ends. During post-production processes, for example to provide pharmaceutical containers, one or both of the open ends can be closed, such as e.g., via hot forming.

There are several problems known in the art associated with glass tubes for pharmaceutical containers and their production. It has been described that the interior of the pharmaceutical containers and the products kept therein may be affected by condensates during production.

In pharmaceutical containers, such as ampoules and vials, condensates originating from the glass compositions have been observed and detected.

The described problems lead to customer dissatisfaction for several reasons.

In some cases, it was reported by the medical personnel that visual assessment of the pharmaceutical products kept in the containers has been impaired. For example, colourless containers are preferred and desirable for light-insensitive pharmaceutical ingredients which allows a quick final check for any product decay.

The presence of condensates in the pharmaceutical containers may even cause harm for the patient, particularly upon oral or intravenous administration of the pharmaceutical ingredients. Similarly, the presence of condensates originating from the glass compositions may hamper the quality and medical efficacy of the pharmaceutical products.

It is thus an object of the invention to solve the problems known in the art and to overcome the undesired effects during the production of glass tubes for pharmaceutical containers.

SUMMARY

In a first aspect, the invention relates to a glass tube for pharmaceutical containers, the glass tube having an inner surface and an outer surface, the glass tube having an inner diameter $d_i$ and an outer diameter $d_o$, the glass tube having a length $l_a$ along its longitudinal axis, the glass tube having a first end and a second end, the glass tube having a middle section, a first location and a second location, wherein the middle section extends to a distance of 5 $d_i$ centred around the position of 0.5 $l_a$ along the longitudinal axis, wherein the first location is at a distance of 15 mm from the first end and the second location is at a distance of 15 mm from the second end, the glass tube having a first intermediate location and a second intermediate location, wherein the first intermediate location is at a distance of 10 $d_i$ from the first end and the second intermediate location is at a distance of 10 $d_i$ from the second end, wherein the first intermediate location is at most at a distance of 75 mm from the first end, wherein the second intermediate location is at most at a distance of 75 mm from the second end, the glass tube having a first vicinity between the first location and the first intermediate location, wherein the first end is formed into a first closed end, wherein preferably the first vicinity is devoid of a lamp ring, wherein the ratio of transmittance for at least one wavelength and/or over the entire wavelength range in the range of 350 to 800 nm for the first vicinity and the middle section is at least 0.97, preferably at least 0.99; and/or wherein the first vicinity has a hydrolytic resistance characterized by an alkali leachability of less than 0.9 μg cm$^{-2}$, less than 0.7 μg cm$^{-2}$, or less than 0.5 μg cm$^{-2}$, determined as relative concentration in an eluate prepared according to ISO 4802-2:2010, except that the initial rinsing steps with distilled water at ambient temperature are omitted; and/or wherein the ratio of the alkali leachability of the first vicinity and the alkali leachability of the middle section is between 0.5 and 2.0, between 0.9 and 1.1, or between 0.99 and 1.01.

The invention thus provides a glass tube for pharmaceutical containers which does not suffer from the problems known in the art. The reduced alkali leachability on the inner surface further provides for and establishes less condensates in the pharmaceutical container.

In a second aspect, the invention relates to the use of a glass tube according to the invention for making a pharmaceutical container, wherein the pharmaceutical container preferably has a capacity from 1 to 150 ml, 2 to 40 ml, 3 to 30 ml, or 4 to 20 ml.

In a third aspect, the invention relates to a process for the production of a glass tube for pharmaceutical containers comprising the steps of providing a glass melt comprising volatile components, such as e.g., borates, preferably melting a batch of raw materials yielding the oxides comprised in the glass melt; forming the glass melt into a glass tube, e.g., by drawing, the glass tube having an inner surface and an outer surface; forming the glass tube into a glass tube with a first end and a second end; forming the first end into a first closed end; reducing the condensation of volatile components, such as e.g., borates, at the inner surface of the glass tube; and optionally forming and/or sealing the second end into a second closed end.

The inventors have established that the process enables the production of a glass tube for pharmaceutical containers which does not suffer from the problems known in the art.

DETAILED DESCRIPTION

Figure 1:
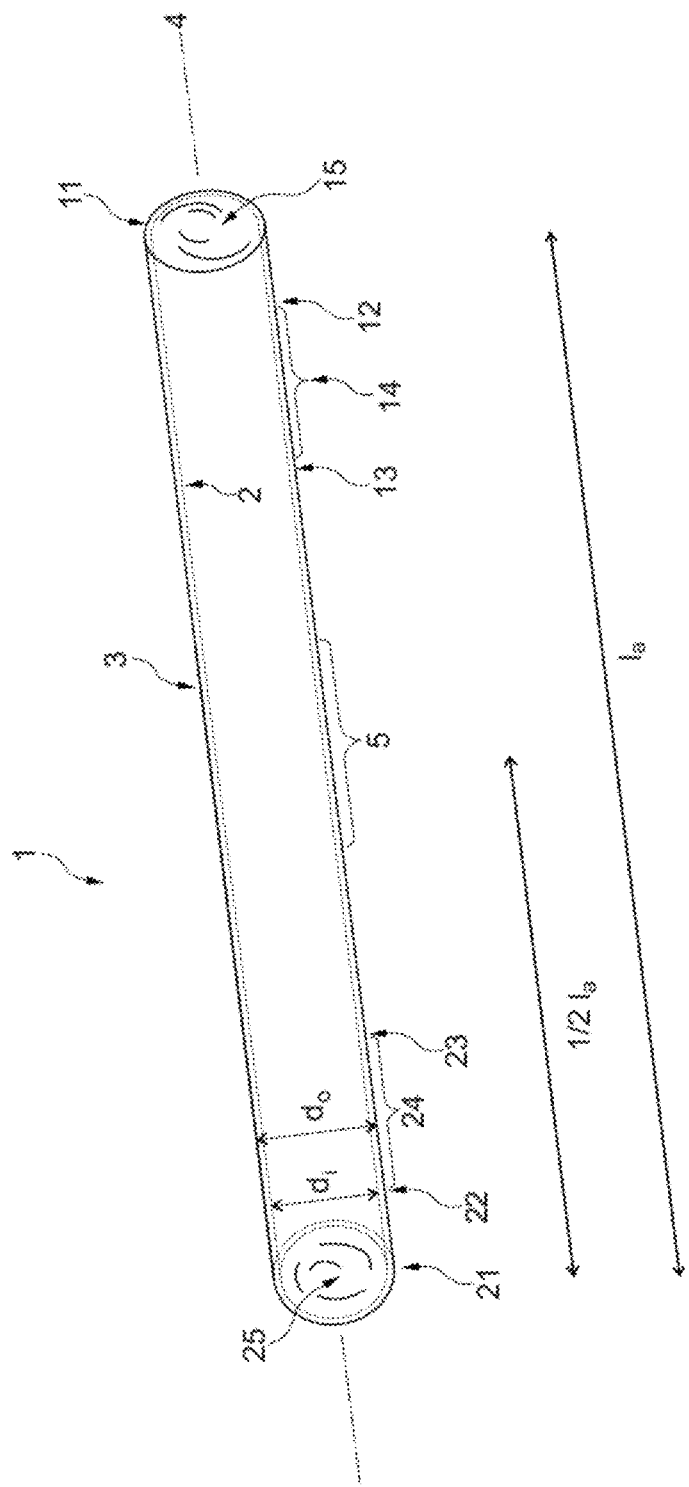
FIG. 1 shows a glass tube for pharmaceutical containers.

A pharmaceutical container includes and refers to cylindrical hollow glass products, such as glass vials, glass ampoules, glass cartridges or glass syringes.

A "lamp ring" refers to a ring of condensed volatile material that is deposited on the inner surface of glass tubes for pharmaceutical containers after hot forming. Particularly, lamp rings may form in a glass tube having a first end formed into a first closed end. In the absence of any counter-measures, a lamp ring will normally occur, particularly when an end is formed into a closed end, typically in the vicinity of the closed end, such as e.g., during or directly after hot forming. In some instances, the lamp ring is formed of borates, e.g., sodium borates, and/or other volatile material.

"Alkali leachability" generally refers to the property that a glass material surface releases alkali metal ions into an aqueous solution in contact with the glass material. Alkali metal ions that leach into a pharmaceutical product may be a problem, particularly for large biotechnologically produced molecules such as antibodies. In this disclosure, a modified ISO 4802-2:2010 method is used to determine "alkali leachability" in an eluate, which is described in more detail in the Examples section. The "alkali leachability" is measured on the inner surface of the glass tube by determining the amount of alkali metal oxides and alkaline earth oxides in the extraction solution using flame atomic emission or absorption spectrometry (flame spectrometry). The alkali leachability is quantified in mg $Na_2O$ and normalised to the inner surface in $cm^2$ subjected to the test.

"Hot forming" involves local heating of a glass tube to a temperature which is sufficient to form the glass, e.g., for forming closed ends. In the locally heated area temperatures of around 1200° C. are reached. Typically, the temperatures used during hot forming correspond to a viscosity of the glass of 104 dPas to 103 dPas.

Where reference is made to "ppm" in the context of solids or liquids, this should be understood as 'weight/weight' (w/w). Where reference is made to "ppm" in the context of gases, this should be understood as 'volume/volume' (vol/vol).

"Glass raw materials" shall be understood as any chemical component that is suitable, in combination with other similar components, to form a glass melt and, optionally after reactions have taken place in the glass melt, a glass product. Examples of glass raw materials used in the context of the invention include, but are not limited to, the oxides of metals and metalloids, the nitrates of metals and metalloids, and the carbonates of metals and metalloids.

If this description refers to a glass composition which is essentially free of a component or does not contain a certain component, or includes the hypothetical case of 0 weight % of that component, it is to be understood that this component may at most be present as an impurity. This means that it is not added in significant quantities and that it is not added intentionally. The term "component" refers to the elemental species as such as well as any molecule containing the element. Non-essential amounts are to be understood as less than 100 ppm, preferably less than 50 ppm, and most preferably less than 10 ppm, based on the weight percentage with respect to all intentionally added components.

"Volatile components" according to the invention are components which are volatile at hot forming conditions, i.e., at temperatures corresponding to a glass viscosity of 104 dPas or less. At this or higher temperatures, the "volatile components" exert a vapour pressure of at least 100 Pa. For example, fining agents selected from the list of chlorides, sulfates and combinations thereof are volatile components. "Volatile components" also include borates, such as e.g., sodium borate, which have a sufficient vapour pressure to sublimate at the high temperatures of the process for the production of a glass tube, and to desublimate at lower temperatures.

A "glass melt" is a volume of a batch of glass raw materials that has a viscosity of less than 1076 dPas. Glass (melt) viscosity can for example be measured using a rotational viscosimeter, e.g., as described in DIN ISO 7884-2:1998-2. The dependence of the viscosity on the temperature is described according to the VFT equation (Vogel-Fulcher-Tammann).

The weight of the batch of glass raw materials should be understood as the entire weight of all the used glass raw materials.

Referring to the figures, and in particular to FIG. 1, a glass tube 1 for pharmaceutical containers according to the present disclosure is shown. Glass tube 1 an inner surface 2 with an inner diameter $d_i$ and an outer surface 3 with an outer diameter $d_o$. The glass tube 1 has a length $l_a$ defined along a longitudinal axis 4 from a first end 11 to a second end 21. The first end 11 is formed into a first closed end 15, while the second end 21 is formed into a second closed end 25.

The glass tube 1 has a middle section 5, a first location 12 and a second location 22, wherein the middle section 5 extends to a distance of 5 $d_i$ centred around the position of 0.5 $l_a$ along the longitudinal axis 4. For example, the first location 12 can be at a distance of 15 mm from the first end 11 and the second location 22 can be at a distance of 15 mm from the second end 21.

The glass tube 1 also has a first intermediate location 13 and a second intermediate location 23, wherein the first intermediate location 13 is at a distance of 10 $d_i$ from the first end 11 and the second intermediate location 23 is at a distance of 10 $d_i$ from the second end 21. For example, the first intermediate location 13 can be at a distance of 75 mm from the first end 11 and the second intermediate location 23 can be at a distance of 75 mm from the second end 21.

The glass tube 1 further has a first vicinity 14 between the first location 12 and the first intermediate location 13 and a second vicinity 24 between the second location 22 and the second intermediate location 23.

In one aspect, the invention relates to a glass tube for pharmaceutical containers, the glass tube having an inner surface and an outer surface, the glass tube having an inner diameter $d_i$ and an outer diameter $d_o$, the glass tube having a length $l_a$ along its longitudinal axis, the glass tube having a first end and a second end, the glass tube having a middle section, a first location and a second location, wherein the middle section extends to a distance of 5 $d_i$ centred around the position of 0.5 $l_a$ along the longitudinal axis, wherein the first location is at a distance of 15 mm from the first end and the second location is at a distance of 15 mm from the second end, the glass tube having a first intermediate location and a second intermediate location, wherein the first intermediate location is at a distance of 10 $d_i$ from the first end and the second intermediate location is at a distance of 10 $d_i$ from the second end, wherein the first intermediate location is at most at a distance of 75 mm from the first end, wherein the second intermediate location is at most at a distance of 75 mm from the second end, the glass tube having a first vicinity between the first location and the first intermediate location, wherein the first end is formed into a first closed end, wherein the ratio of transmittance for at least one wavelength and/or over the entire wavelength range in the range of 350 to 800 nm for the first vicinity and the middle section is at least 0.97, preferably at least 0.99; and/or wherein the first vicinity has a hydrolytic resistance characterized by an alkali leachability of less than 0.9 µg $cm^{-2}$, less than 0.7 µg $cm^{-2}$, or less than 0.5 µg $cm^{-2}$, determined as relative concentration in an eluate prepared according to ISO 4802-2:2010, except that the initial rinsing steps with distilled water at ambient temperature are omitted; and/or wherein the ratio of the alkali leachability of the first vicinity and the alkali leachability of the middle section is between 0.5 and 2.0, between 0.9 and 1.1, or between 0.99 and 1.01.

In an aspect, the invention relates to a glass tube for pharmaceutical containers, the glass tube having an inner surface and an outer surface, the glass tube having an inner diameter $d_i$ and an outer diameter $d_o$, the glass tube having a length $l_a$ along its longitudinal axis, the glass tube having a first end and a second end, the glass tube having a middle section, a first location and a second location, wherein the middle section extends to a distance of 5 $d_i$ centred around the position of 0.5 $l_a$ along the longitudinal axis, wherein the first location is at a distance of 15 mm from the first end and the second location is at a distance of 15 mm from the second end, the glass tube having a first intermediate location and a second intermediate location, wherein the first intermediate location is at a distance of 10 $d_i$ from the first end and the second intermediate location is at a distance of 10 $d_i$ from the second end, wherein the first intermediate location is at most at a distance of 75 mm from the first end, wherein the second intermediate location is at most at a distance of 75 mm from the second end, the glass tube having a first vicinity between the first location and the first intermediate location, wherein the first end is formed into a first closed end, wherein the first vicinity is devoid of a lamp ring, wherein the absence of a lamp ring is characterised by wherein the ratio of transmittance for at least one wavelength and/or over the entire wavelength range in the range of 350 to 800 nm for the first vicinity and the middle section is at least 0.97, preferably at least 0.99; and/or wherein the first vicinity has a hydrolytic resistance characterized by an alkali leachability of less than 0.9 µg $cm^{-2}$, less than 0.7 µg $cm^{-2}$, or less than 0.5 µg $cm^{-2}$, determined as relative concentration in an eluate prepared according to ISO 4802-2:2010, except that the initial rinsing steps with distilled water at ambient temperature are omitted; and/or wherein the ratio of the alkali leachability of the first vicinity and the alkali leachability of the middle section is between 0.5 and 2.0, between 0.9 and 1.1, or between 0.99 and 1.01.

The glass tube for pharmaceutical containers does not suffer from the problems known in the art. Also, the reduced alkali leachability on the inner surface further provides for and establishes less condensates in the pharmaceutical container.

Within the present invention, a glass tube for pharmaceutical containers has an inner surface and an outer surface, and is characterised by an inner diameter $d_i$, an outer diameter $d_o$ and a length $l_a$ along its longitudinal axis, wherein the glass tube has a first end and a second end and a middle section. The middle section extends to a distance of 5 $d_i$ centred around the position of 0.5 $l_a$ along the longitudinal axis, i.e., the middle section is exactly in the centre of the glass tube, and thereby serves as a symmetric reference section for the first end and the second end. In the broad sense of the invention, the glass tube for pharmaceutical containers covers all of the following three options.

First, the glass tube for pharmaceutical containers can open-ended, i.e., both the first end and the second end are open. Second, the glass tube for pharmaceutical containers can have one closed end, i.e., the first end is formed into a first closed end. Third, the glass tube for pharmaceutical containers can have two closed ends, i.e., the first end is formed into a first closed end, and the second end is formed into a second closed end.

In one embodiment of the glass tube for pharmaceutical containers, the ratio of transmittance for at least one wavelength and/or over the entire wavelength range in the range of 350 to 800 nm for the first vicinity and the middle section is at least 0.97, preferably at least 0.99. Advantageously, this allows an unimpaired visual assessment of the pharmaceutical ingredients kept and transported in the pharmaceutical containers.

The ratio of transmittance for at least one wavelength in the range of 350 to 800 nm and/or over the entire wavelength range at the first vicinity and at the middle section can for example be measured by spectroscopy. To this end, the glass tubes are cut into half shells which allows to steer the light beam easily and accurately through the half glass tube. Each half shell of the glass tube is orientated appropriately in order to meet the measurement conditions with respect to perpendicularity of the light beam and the surface area for each single surface area. At least one wavelength and/or the entire wavelength range in the range of 350 to 800 nm may serve to establish the transmittance. To determine the ratio of transmittance for a given wavelength or wavelength range between the first vicinity and the middle section of the glass tube, the skilled artisan knows how to establish and provide constant measurement parameters. The transmittance has to be determined under the same geometric and illumination conditions. The thickness of the glass tube at the first vicinity and the middle section may essentially be the same.

In one embodiment of the glass tube for pharmaceutical containers, the ratio of transmittance for at least one wavelength and/or over the entire wavelength range in the range of 350 to 800 nm for the first vicinity and the middle section is at least 0.97, preferably at least 0.99. In this context it is understood that in the ideal or hypothetic case, i.e., by definition, the ratio of transmittance for at least one wavelength and/or over the entire wavelength range in the range of 350 to 800 nm for the first vicinity and the middle section would be 1.00. In the absence of any artefacts, the glass tube for pharmaceutical containers would thus be characterised by a transmittance which is identical for the first vicinity and the middle section. In one embodiment of the glass tube for pharmaceutical containers, the ratio of transmittance for at least one wavelength and/or over the entire wavelength range in the range of 350 to 800 nm for the first vicinity and the middle section is 1.00 or less.

In one embodiment of the glass tube for pharmaceutical containers, the first vicinity has a hydrolytic resistance characterized by an alkali leachability of less than 0.9 µg $cm^{-2}$, less than 0.8 µg $cm^{-2}$, less than 0.7 µg $cm^{-2}$, less than 0.6 µg $cm^{-2}$, less than 0.5 µg $cm^{-2}$, less than 0.4 µg $cm^{-2}$, or less than 0.3 µg $cm^{-2}$, determined as relative concentration in an eluate prepared according to ISO 4802-2:2010, except that the initial rinsing steps with distilled water at ambient temperature are omitted.

In the present invention, the terminology "hydrolytic resistance" is identical to and refers to the alkali leachability.

That means that a reduction of the alkali leachability shall be understood as an improvement of the hydrolytic resistance.

It is advantageous to improve the hydrolytic resistance characterized by an alkali leachability in the first vicinity, and to establish conditions which remain below a certain acceptable upper level. For example, and particularly in the absence of counter-measures, condensates on the inner surface of the glass tube may form during production. Such condensates may originate from volatile components that may be present in the glass melt and cause a number of undesirable effects associated with the pharmaceutical containers. In the worst case, the mentioned condensates may affect the quality of the pharmaceutical product. In other cases, quality loss of the pharmaceutical product may be observed.

A modified ISO 4802-2:2010 method is used to determine the alkali leachability in an eluate, which is described in more detail in the Examples section. In particular, the ISO 4802-2:2010 has been adapted such that the initial rinsing steps with distilled water at ambient temperature (cf. Point 8.2) are omitted. After first removing any packaging debris or dirt which has collected during storage and transport, according to Point 8.2 of ISO 4802-2:2010, this rinsing step is intended to further remove any chemical condensates that would remain after the first step.

The alkali leachability is measured by determining the amount of alkali metal oxides and alkaline earth oxides in the extraction solution using flame atomic emission or absorption spectrometry (flame spectrometry). The alkali leachability is quantified in $\mu g$ $Na_2O$ and normalised to the inner surface in $cm^2$ subjected to the test.

In one embodiment of the glass tube for pharmaceutical containers, the first vicinity has a hydrolytic resistance characterized by an alkali leachability of, at least 0.01 $\mu g$ $cm^{-2}$, at least 0.02 $\mu g$ $cm^{-2}$, at least 0.05 $\mu g$ $cm^{-2}$, at least 0.07 $\mu g$ $cm^{-2}$, at least 0.10 $\mu g$ $cm^{-2}$, at least 0.15 $\mu g$ $cm^{-2}$, or at least 0.20 $\mu g$ $cm^{-2}$, determined as relative concentration in an eluate prepared according to ISO 4802-2:2010, except that the initial rinsing steps with distilled water at ambient temperature are omitted.

In one embodiment of the glass tube for pharmaceutical containers, the first vicinity has a hydrolytic resistance characterized by an alkali leachability of 0.01 $\mu g$ $cm^{-2}$ to 0.9 $\mu g$ $cm^{-2}$, 0.02 $\mu g$ $cm^{-2}$ to 0.81 $\mu g$ $cm^{-2}$, 0.051 $\mu g$ $cm^{-2}$ to 0.71 $\mu g$ $cm^{-2}$, 0.071 $\mu g$ $cm^{-2}$ to 0.61 $\mu g$ $cm^{-2}$, 0.101 $\mu g$ $cm^{-2}$ to 0.5 $\mu g$ $cm^{-2}$, 0.15 $\mu g$ $cm^{-2}$ to 0.4 $\mu g$ $cm^{-2}$, or 0.201 $\mu g$ $cm^{-2}$ to 0.3 $\mu g$ $cm^{-2}$, determined as relative concentration in an eluate prepared according to ISO 4802-2:2010, except that the initial rinsing steps with distilled water at ambient temperature are omitted.

In one embodiment of the glass tube for pharmaceutical containers, the ratio of the alkali leachability of the first vicinity and the alkali leachability of the middle section is between 0.5 and 2.0, between 0.7 and 1.4, between 0.8 and 1.2, between 0.9 and 1.1, between 0.95 and 1.05, between 0.97 and 1.03, or between 0.99 and 1.01.

It is advantageous that the glass tube for pharmaceutical containers displays a homogeneous alkali leachability. In other words, the alkali leachability of the glass tube for pharmaceutical containers displays an essentially similar, or essentially the same, alkali leachability for both the first vicinity and the middle section.

It is advantageous that the glass tube for pharmaceutical containers avoids the problems known from the art, such as the formation of a lamp ring near the first end which is formed into a first closed end, i.e., in the first vicinity. Often this undesired artefact may be accompanied by an increased alkali leachability in the first vicinity. It is therefore desirable and advantageous to provide a glass tube for pharmaceutical containers, wherein the ratio of the alkali leachability of the first vicinity and the alkali leachability of the middle section is between 0.5 and 2.0, between 0.9 and 1.1, or between 0.99 and 1.01.

In one embodiment of the glass tube for pharmaceutical containers, the middle section of the glass tube has a hydrolytic resistance characterized by an alkali leachability of less than 0.4 $\mu g$ $cm^{-2}$, less than 0.35 $\mu g$ $cm^{-2}$, less than 0.3 $\mu g$ $cm^{-2}$, less than 0.25 $\mu g$ $cm^{-2}$, or less than 0.2 $\mu g$ $cm^{-2}$, determined as relative concentration in an eluate prepared according to ISO 4802-2:2010, except that the initial rinsing steps with distilled water at ambient temperature are omitted.

In the absence of any counter-measures, condensates on the inner surface of the glass tube form during production. Such condensates originate from volatile components present in the glass melt and cause a number of undesirable effects associated with the pharmaceutical containers. Condensates in the middle section of the glass tube may for example form when an end is formed into a closed end, as a result of and after hot forming. The condensates in the middle section of the glass tube are sometimes referred to as "haze" and may form over time scales from several hours, e.g., 12 hours, to two days, e.g., 40 hours, after hot forming, e.g., of a closed end. The "haze" may be a "borate haze" resulting from desublimation of borate molecules (e.g., sodium borate), including also borate crystals, on the inner surface of the glass tube, which may appear visible.

It is advantageous to reduce the alkali leachability to less than 0.4 $\mu g$ $cm^{-2}$, because it provides for and establishes significantly less condensates in the pharmaceutical container. The glass tube for pharmaceutical containers thus avoids, or at least diminishes, condensates which may affect the pharmaceutical products contained therein. Similarly, the glass tube for pharmaceutical containers avoids, or at least diminishes, quality loss of the pharmaceutical product.

In one embodiment of the glass tube for pharmaceutical containers, the middle section of the glass tube has a hydrolytic resistance characterized by an alkali leachability of at least 0.01 $\mu g$ $cm^{-2}$, at least 0.02 $\mu g$ $cm^{-2}$, at least 0.05 $\mu g$ $cm^{-2}$, at least 0.07 $\mu g$ $cm^{-2}$, at least 0.10 $\mu g$ $cm^{-2}$, or at least 0.15 $\mu g$ $cm^{-2}$, determined as relative concentration in an eluate prepared according to ISO 4802-2:2010, except that the initial rinsing steps with distilled water at ambient temperature are omitted.

In one embodiment of the glass tube for pharmaceutical containers, the middle section of the glass tube has a hydrolytic resistance characterized by an alkali leachability of 0.01 $\mu g$ $cm^{-2}$ to 0.4 $\mu g$ $cm^{-2}$, 0.02 $\mu g$ $cm^{-2}$ to 0.35 $\mu g$ $cm^{-2}$, 0.05 $\mu g$ $cm^{-2}$ to 0.3 $\mu g$ $cm^{-2}$, 0.07 $\mu g$ $cm^{-2}$ to 0.25 $\mu g$ $cm^{-2}$, or 0.10 $\mu g$ $cm^{-2}$ to 0.2 $\mu g$ $cm^{-2}$, determined as relative concentration in an eluate prepared according to ISO 4802-2:2010, except that the initial rinsing steps with distilled water at ambient temperature are omitted.

In one embodiment of the glass tube for pharmaceutical containers, the first vicinity has a hydrolytic resistance characterized by an alkali leachability determined as relative concentration in an eluate prepared according to ISO 4802-2:2010, wherein a difference of less than 0.3 $\mu g$ $cm^{-2}$, less than 0.25 $\mu g$ $cm^{-2}$, less than 0.2 $\mu g$ $cm^{-2}$, less than 0.15 $\mu g$ $cm^{-2}$, or less than 0.1 $\mu g$ $cm^{-2}$, is observed between the ISO 4802-2:2010 method performed with the initial rinsing steps with distilled water at ambient temperature and the ISO 4802-2:2010 method performed without the initial rinsing steps.

It is advantageous that the glass tube for pharmaceutical containers may display less condensates in the first vicinity which may be detected and characterized as a reduced alkali leachability. The reduced alkali leachability of the first vicinity may thus also be reflected in the finding that the relative concentration difference of the alkali leachability is reduced, compared to an ISO 4802-2:2010 method carried out in the presence or absence of the initial rinsing steps.

In one embodiment of the glass tube for pharmaceutical containers, the first vicinity has a hydrolytic resistance characterized by an alkali leachability determined as relative concentration in an eluate prepared according to ISO 4802-2:2010, wherein a difference of at least 0.01 µg cm$^{-2}$, at least 0.02 µg cm$^{-2}$, at least 0.05 µg cm$^{-2}$, or at least 0.07 µg cm$^{-2}$, is observed between the ISO 4802-2:2010 method performed with the initial rinsing steps with distilled water at ambient temperature and the ISO 4802-2:2010 method performed without the initial rinsing steps.

In one embodiment of the glass tube for pharmaceutical containers, the first vicinity has a hydrolytic resistance characterized by an alkali leachability determined as relative concentration in an eluate prepared according to ISO 4802-2:2010, wherein a difference of 0.01 µg cm$^{-2}$ to 0.3 µg cm$^{-2}$, 0.02 µg cm$^{-2}$ to 0.25 µg cm$^{-2}$, 0.05 µg cm$^{-2}$ to 0.2 µg cm$^{-2}$, or 0.07 µg cm$^{-2}$ to 0.15 µg cm$^{-2}$, is observed between the ISO 4802-2:2010 method performed with the initial rinsing steps with distilled water at ambient temperature and the ISO 4802-2:2010 method performed without the initial rinsing steps.

Glass Composition and Dimensions

In one embodiment of the glass tube for pharmaceutical containers, the glass tube comprises a glass composition, wherein the glass composition comprises volatile components, e.g., a fining agent selected from the list of chlorides, sulfates and combinations thereof.

It is advantageous to use a fining agent in the glass composition to allow for bubble removal from the glass melt during the production process of the glass tube for pharmaceutical containers.

In one embodiment of the glass tube for pharmaceutical containers, the glass composition comprises a fining agent and is essentially free of arsenic and antimony.

In one embodiment of the glass tube for pharmaceutical containers, the glass composition comprises a fining agent selected from the list of chlorides, sulfates and combinations thereof.

In one embodiment of the glass tube for pharmaceutical containers, the glass tube comprises a glass composition selected from the list of soda-lime glass, borosilicate glass, aluminosilicate glass, a glass comprising from 5 mol % to 20 mol % boric oxide, based on all oxides present in the glass composition.

In one embodiment of the glass tube for pharmaceutical containers, the glass tube comprises a glass composition comprising 5 to 20 mol % $B_2O_3$ and/or 2 to 10 mol % $Na_2O$. Optionally, the glass composition comprises 60 to 85 mol % $SiO_2$, 5 to 20 mol % $B_2O_3$, 2 to 10 mol % $Al_2O_3$, 0 to 2 mol % $Fe_2O_3$, 2 to 10 mol % $Na_2O$, 0 to 5 mol % $K_2O$, 0 to 2 mol % BaO, 0 to 2 mol % CaO, and/or 0 to 10 mol % $TiO_2$, based on all oxides present in the glass composition.

In one embodiment, the glass composition comprises at least 60 mol % $SiO_2$, at least 62 mol % $SiO_2$, at least 64 mol % $SiO_2$, at least 66 mol % $SiO_2$, or at least 68 mol % $SiO_2$, based on all oxides present in the glass composition. In one embodiment, the glass composition comprises 85 mol % $SiO_2$ or less, 83 mol % $SiO_2$ or less, 81 mol % $SiO_2$ or less, 79 mol % $SiO_2$ or less, or 77 mol % $SiO_2$ or less, based on all oxides present in the glass composition. In one embodiment, the glass composition comprises 60 to 85 mol % $SiO_2$, 62 to 83 mol % $SiO_2$, 64 to 81 mol % $SiO_2$, 66 to 79 mol % $SiO_2$, or 68 to 77 mol % $SiO_2$, based on all oxides present in the glass composition.

In one embodiment, the glass composition comprises at least 5.0 mol % $B_2O_3$, at least 5.5 mol % $B_2O_3$, at least 6.0 mol % $B_2O_3$, at least 6.5 mol % $B_2O_3$, or at least 7.0 mol % $B_2O_3$, based on all oxides present in the glass composition. In one embodiment, the glass composition comprises 20.0 mol % $B_2O_3$ or less, 18.0 mol % $B_2O_3$ or less, 16.0 mol % $B_2O_3$ or less, 14.0 mol % $B_2O_3$ or less, or 12.0 mol % $B_2O_3$ or less, based on all oxides present in the glass composition. In one embodiment, the glass composition comprises 5.0 to 20.0 mol % $B_2O_3$, 5.5 to 18.0 mol % $B_2O_3$, 6.0 to 16.0 mol % $B_2O_3$, 6.5 to 14.0 mol % $B_2O_3$, or 7.0 to 12.0 mol % $B_2O_3$, based on all oxides present in the glass composition.

In one embodiment, the glass composition comprises at least 2.0 mol % $Al_2O_3$, at least 3.0 mol % $Al_2O_3$, at least 4.0 mol % $Al_2O_3$, or at least 5.0 mol % $Al_2O_3$, based on all oxides present in the glass composition. In one embodiment, the glass composition comprises 10.0 mol % $Al_2O_3$ or less, 9.0 mol % $Al_2O_3$ or less, 8.0 mol % $Al_2O_3$ or less, or 7.0 mol % $Al_2O_3$ or less, based on all oxides present in the glass composition. In one embodiment, the glass composition comprises 2.0 to 10.0 mol % $Al_2O_3$, 3.0 to 9.0 mol % $Al_2O_3$, 4.0 to 8.0 mol % $Al_2O_3$, or 5.0 to 7.0 mol % $Al_2O_3$, based on all oxides present in the glass composition.

In one embodiment, the glass composition comprises at least 0 mol % $Fe_2O_3$, at least 0.2 mol % $Fe_2O_3$, or at least 0.5 mol % $Fe_2O_3$, based on all oxides present in the glass composition. In one embodiment, the glass composition comprises 2.0 mol % $Fe_2O_3$ or less, 1.5 mol % $Fe_2O_3$ or less, or 1.2 mol % $Fe_2O_3$ or less, based on all oxides present in the glass composition. In one embodiment, the glass composition comprises 0 to 2.0 mol % $Fe_2O_3$, 0.2 to 1.5 mol % $Fe_2O_3$, or 0.5 to 1.2 mol % $Fe_2O_3$, based on all oxides present in the glass composition.

In one embodiment, the glass composition comprises at least 2 mol % $Na_2O$, at least 4 mol % $Na_2O$, or at least 6 mol % $Na_2O$, based on all oxides present in the glass composition. In one embodiment, the glass composition comprises 10 mol % $Na_2O$ or less, 9 mol % $Na_2O$ or less, or 8 mol % $Na_2O$ or less, based on all oxides present in the glass composition. In one embodiment, the glass composition comprises 2 to 10 mol % $Na_2O$, 4 to 9 mol % $Na_2O$, or 6 to 8 mol % $Na_2O$, based on all oxides present in the glass composition.

In one embodiment, the glass composition comprises at least 0.0 mol % $K_2O$, at least 0.2 mol % $K_2O$, or at least 0.5 mol % $K_2O$, based on all oxides present in the glass composition. In one embodiment, the glass composition comprises 5.0 mol % $K_2O$ or less, 3.5 mol % $K_2O$ or less, 2.5 mol % $K_2O$ or less, 2.0 mol % $K_2O$ or less, or 1.5 mol % $K_2O$ or less, based on all oxides present in the glass composition. In one embodiment, the glass composition comprises 0.0 to 5.0 mol % $K_2O$, 0.2 to 3.5 mol % $K_2O$, or 0.5 to 2.5 mol % $K_2O$, based on all oxides present in the glass composition.

In one embodiment, the glass composition comprises at least 0.0 mol % BaO, at least 0.2 mol % BaO, or at least 0.5 mol % BaO, based on all oxides present in the glass composition. In one embodiment, the glass composition comprises 3.0 mol % BaO or less, 2.5 mol % BaO or less, or 2.0 mol % BaO or less, based on all oxides present in the glass composition. In one embodiment, the glass composition comprises 0.0 to 3.0 mol % BaO, 0.2 to 2.5 mol % BaO, or 0.5 to 2.0 mol % BaO, based on all oxides present in the glass composition.

In one embodiment, the glass composition comprises at least 0.0 mol % CaO, at least 0.2 mol % CaO, or at least 0.5 mol % CaO, based on all oxides present in the glass composition. In one embodiment, the glass composition comprises 3.0 mol % CaO or less, 2.5 mol % CaO or less, or 2.0 mol % CaO or less, based on all oxides present in the glass composition. In one embodiment, the glass composition comprises 0.0 to 3.0 mol % CaO, 0.2 to 2.5 mol % CaO, or 0.5 to 2.0 mol % CaO, based on all oxides present in the glass composition.

In one embodiment, the glass composition comprises at least 0.0 mol % $TiO_2$, at least 1.0 mol % $TiO_2$, at least 2.0 mol % $TiO_2$, at least 3.0 mol % $TiO_2$, or at least 4.0 mol % $TiO_2$, based on all oxides present in the glass composition. In one embodiment, the glass composition comprises 10.0 mol % $TiO_2$ or less, 9.0 mol % $TiO_2$ or less, 8.0 mol % $TiO_2$ or less, 7.0 mol % $TiO_2$ or less, or 6.0 mol % $TiO_2$ or less, based on all oxides present in the glass composition. In one embodiment, the glass composition comprises 0.0 to 10.0 mol % $TiO_2$, 1.0 to 9.0 mol % $TiO_2$, 2.0 to 8.0 mol % $TiO_2$, 3.0 to 7.0 mol % $TiO_2$, or 4.0 to 6.0 mol % $TiO_2$, based on all oxides present in the glass composition.

In one embodiment, the glass tube has an inner diameter from 5.0 to 49.0 mm, preferably 9.0 to 26 mm, and/or an outer diameter from 6.0 to 50 mm, preferably 8.0 to 30 mm, and/or a glass wall thickness of 0.5 to 2.0 mm, preferably 0.6 to 1.5 mm, and/or a length $l_a$ from 125 to 5000 mm, preferably 500 to 3000 mm, more preferably 1000 to 2000 mm.

In one embodiment of the glass tube for pharmaceutical containers, the glass tube has an inner diameter from 5.0 to 49.0 mm, 6.0 to 45.0 mm, 7.0 to 40.0 mm, 8.0 to 35.0 mm, or 9.0 to 26 mm.

In one embodiment of the glass tube for pharmaceutical containers, the glass tube has an outer diameter from 6.0 to 50 mm, 7.0 to 40 mm, or 8.0 to 30 mm.

In one embodiment of the glass tube for pharmaceutical containers, the glass tube has a glass wall thickness of 0.5 to 2.0 mm, 0.6 to 1.5 mm, 0.7 to 1.3 mm, or 0.8 to 1.2 mm.

In one embodiment of the glass tube for pharmaceutical containers, the glass tube has a length $l_a$ from 125 to 5000 mm, 300 to 4000 mm, 500 to 3000 mm, or 1000 to 2000 mm.

In one embodiment of the glass tube for pharmaceutical containers, the second end of the glass tube is formed and/or sealed into a second closed end, wherein preferably the first closed end and/or the second closed end is a flat-bottom.

In one embodiment of the glass tube for pharmaceutical containers, the first end of the glass tube is formed and/or sealed into a first closed end, wherein the second end is an open end.

In one embodiment of the glass tube for pharmaceutical containers, the first end of the glass tube is formed into a first closed end, and the second end of the glass tube is formed into a second closed end, wherein preferably a pressure compensation vent hole is present at the first vicinity and/or the second vicinity, wherein the second vicinity is defined as the inner surface of the glass tube between the second location and the second intermediate location.

In one embodiment of the glass tube for pharmaceutical containers, the first end of the glass tube is formed into a first closed end, and the second end of the glass tube is sealed into a second closed end, wherein preferably the second closed end is sealed with perforated foil.

In one embodiment of the glass tube for pharmaceutical containers, the glass tube has a second vicinity between the second location and the second intermediate location, wherein the second end is formed into a second closed end, wherein preferably the second vicinity of the second closed end is devoid of a lamp ring, wherein the ratio of transmittance for at least one wavelength and/or over the entire wavelength range in the range of 350 to 800 nm for the second vicinity of the second closed end and the middle section is at least 0.97, preferably at least 0.99; and/or wherein the second vicinity of the second closed end has a hydrolytic resistance characterized by an alkali leachability of less than 0.9 μg cm$^{-2}$ determined as relative concentration in an eluate prepared according to ISO 4802-2:2010, except that the initial rinsing steps with distilled water at ambient temperature are omitted; and/or wherein the ratio of the alkali leachability of the second vicinity and the alkali leachability of the middle section is between 0.5 and 2.0, between 0.9 and 1.1, or between 0.99 and 1.01.

In one embodiment of the glass tube for pharmaceutical containers, the ratio of transmittance for at least one wavelength and/or over the entire wavelength range in the range of 350 to 800 nm for the second vicinity of the second closed end and the middle section is at least 0.97, preferably at least 0.99. Advantageously this allows an unimpaired visual assessment of the pharmaceutical ingredients kept and transported in the pharmaceutical containers.

In one embodiment of the glass tube for pharmaceutical containers, the ratio of transmittance for at least one wavelength and/or over the entire wavelength range in the range of 350 to 800 nm for the second vicinity of the second closed end and the middle section is at least 0.97, preferably at least 0.99. In this context it is understood that in the ideal or hypothetic case, i.e., by definition, the ratio of transmittance for at least one wavelength and/or over the entire wavelength range in the range of 350 to 800 nm for the second vicinity of the second closed end and the middle section would be 1.00. In the absence of any artefacts, the glass tube for pharmaceutical containers would thus be characterised by a transmittance which is identical for the second vicinity of the second closed end and the middle section.

In one embodiment of the glass tube for pharmaceutical containers, the second vicinity of the second closed end has a hydrolytic resistance characterized by an alkali leachability of less than 0.9 μg cm$^{-2}$, less than 0.8 μg cm$^{-2}$, less than 0.7 μg cm$^{-2}$, less than 0.6 μg cm$^{-2}$, less than 0.5 μg cm$^{-2}$, or less than 0.4 μg cm$^{-2}$, determined as relative concentration in an eluate prepared according to ISO 4802-2:2010, except that the initial rinsing steps with distilled water at ambient temperature are omitted.

It is advantageous to improve the hydrolytic resistance characterized by an alkali leachability in the second vicinity of the second closed end, and to establish conditions which remain below a certain acceptable upper level. For example, and particularly in the absence of counter-measures, condensates on the inner surface of the glass tube may form during production. Such condensates may originate from volatile components that may be present in the glass melt and cause a number of undesirable effects associated with the pharmaceutical containers. In the worst case, the mentioned condensates may severely affect the pharmaceutical product. Partial or complete quality loss of the pharmaceutical product may be observed.

In one embodiment of the glass tube for pharmaceutical containers, the second vicinity of the second closed end has a hydrolytic resistance characterized by an alkali leachability of at least 0.01 μg cm$^{-2}$, at least 0.02 μg cm$^{-2}$, at least 0.05 µg cm$^{-2}$, at least 0.07 µg cm$^{-2}$, at least 0.10 µg cm$^{-2}$, at least 0.15 µg cm$^{-2}$, or at least 0.20 µg cm$^{-2}$, determined as relative concentration in an eluate prepared according to ISO 4802-2:2010, except that the initial rinsing steps with distilled water at ambient temperature are omitted.

In one embodiment of the glass tube for pharmaceutical containers, the second vicinity of the second closed end has a hydrolytic resistance characterized by an alkali leachability of 0.01 µg cm$^{-2}$ to 0.9 µg cm$^{-2}$, 0.02 µg cm$^{-2}$ to 0.8 µg cm$^{-2}$, 0.05 µg cm$^{-2}$ to 0.7 µg cm$^{-2}$, 0.07 µg cm$^{-2}$ to 0.6 µg cm$^{-2}$, 0.10 µg cm$^{-2}$ to 0.5 µg cm$^{-2}$, or 0.15 µg cm$^{-2}$ to 0.4 µg cm$^{-2}$, determined as relative concentration in an eluate prepared according to ISO 4802-2:2010, except that the initial rinsing steps with distilled water at ambient temperature are omitted.

In one embodiment of the glass tube for pharmaceutical containers, the ratio of the alkali leachability of the second vicinity and the alkali leachability of the middle section is between 0.5 and 2.0, between 0.7 and 1.4, between 0.8 and 1.2, between 0.9 and 1.1, preferably between 0.99 and 1.01.

It is advantageous that the glass tube for pharmaceutical containers displays a homogeneous alkali leachability. In other words, the alkali leachability of the glass tube for pharmaceutical containers displays an essentially similar, or essentially the same, alkali leachability for both the second vicinity and the middle section.

It is advantageous that the glass tube for pharmaceutical containers avoids the formation of a lamp ring near the second end which is formed into a second closed end, i.e., in the second vicinity of the second closed end. Often this undesired artefact may be accompanied by an increased alkali leachability in the second vicinity. It is therefore desirable and advantageous to provide a glass tube for pharmaceutical containers, wherein the ratio of the alkali leachability of the second vicinity and the alkali leachability of the middle section is between 0.5 and 2.0, between 0.9 and 1.1, or between 0.99 and 1.01.

In one embodiment of the glass tube for pharmaceutical containers, the second vicinity of the second closed end has a hydrolytic resistance characterized by an alkali leachability determined as relative concentration in an eluate prepared according to ISO 4802-2:2010, wherein a difference of less than 0.3 µg cm$^{-2}$ is observed between the ISO 4802-2:2010 method performed with the initial rinsing steps with distilled water at ambient temperature and the ISO 4802-2:2010 method performed without the initial rinsing steps.

It is advantageous that the glass tube for pharmaceutical containers may display less condensates in the second vicinity of the second closed end which may be detected and characterized as a reduced alkali leachability on the inner surface. The reduced alkali leachability of the second vicinity of the second closed end may thus also be reflected in the finding that the relative concentration difference of the alkali leachability is reduced, compared to an ISO 4802-2:2010 method carried out in the presence or absence of the initial rinsing steps.

In one embodiment of the glass tube for pharmaceutical containers, the second vicinity of the second closed end has a hydrolytic resistance characterized by an alkali leachability determined as relative concentration in an eluate prepared according to ISO 4802-2:2010, wherein a difference of at least 0.01 µg cm$^{-2}$, at least 0.02 µg cm$^{-2}$, at least 0.05 µg cm$^{-2}$, or at least 0.07 µg cm$^{-2}$, is observed between the ISO 4802-2:2010 method performed with the initial rinsing steps with distilled water at ambient temperature and the ISO 4802-2:2010 method performed without the initial rinsing steps.

In one embodiment of the glass tube for pharmaceutical containers, the second vicinity of the second closed end has a hydrolytic resistance characterized by an alkali leachability determined as relative concentration in an eluate prepared according to ISO 4802-2:2010, wherein a difference of 0.01 µg cm$^{-2}$ to 0.3 µg cm$^{-2}$, 0.02 µg cm$^{-2}$ to 0.25 µg cm$^{-2}$, 0.05 µg cm$^{-2}$ to 0.2 µg cm$^{-2}$, or 0.07 µg cm$^{-2}$ to 0.15 µg cm$^{-2}$, is observed between the ISO 4802-2:2010 method performed with the initial rinsing steps with distilled water at ambient temperature and the ISO 4802-2:2010 method performed without the initial rinsing steps.

In one embodiment, the invention relates to a glass tube for pharmaceutical containers, wherein the glass tube comprises a glass composition comprising 5 to 20 mol % $B_2O_3$ and/or 2 to 10 mol % $Na_2O$, wherein the ratio of transmittance for at least one wavelength and/or over the entire wavelength range in the range of 350 to 800 nm for the first vicinity and the middle section is at least 0.97, preferably at least 0.99.

In one embodiment, the invention relates to a glass tube for pharmaceutical containers, wherein the glass tube comprises a glass composition comprising 5 to 20 mol % $B_2O_3$ and/or 2 to 10 mol % $Na_2O$, wherein the first vicinity has a hydrolytic resistance characterized by an alkali leachability of less than 0.5 µg cm$^{-2}$, determined as relative concentration in an eluate prepared according to ISO 4802-2:2010, except that the initial rinsing steps with distilled water at ambient temperature are omitted.

In one embodiment, the invention relates to a glass tube for pharmaceutical containers, wherein the glass tube comprises a glass composition comprising 5 to 20 mol % $B_2O_3$ and/or 2 to 10 mol % $Na_2O$, wherein the ratio of the alkali leachability of the first vicinity and the alkali leachability of the middle section is between 0.5 and 2.0, between 0.9 and 1.1, or between 0.99 and 1.01.

In one embodiment, the invention relates to a glass tube for pharmaceutical containers, wherein the glass tube comprises a glass composition comprising 5 to 20 mol % $B_2O_3$ and/or 2 to 10 mol % $Na_2O$, wherein the first vicinity has a hydrolytic resistance characterized by an alkali leachability of less than 0.5 µg cm$^{-2}$, determined as relative concentration in an eluate prepared according to ISO 4802-2:2010, except that the initial rinsing steps with distilled water at ambient temperature are omitted, and wherein the middle section of the glass tube has a hydrolytic resistance characterized by an alkali leachability of less than 0.25 µg cm', determined as relative concentration in an eluate prepared according to ISO 4802-2:2010, except that the initial rinsing steps with distilled water at ambient temperature are omitted.

In one embodiment, the invention relates to a glass tube for pharmaceutical containers, wherein the glass tube comprises a glass composition comprising 5 to 20 mol % $B_2O_3$ and/or 2 to 10 mol % $Na_2O$, wherein the first vicinity has a hydrolytic resistance characterized by an alkali leachability of less than 0.5 µg cm$^{-2}$, determined as relative concentration in an eluate prepared according to ISO 4802-2:2010, except that the initial rinsing steps with distilled water at ambient temperature are omitted, wherein the glass tube has an inner diameter from 9.0 to 26 mm, an outer diameter from 8.0 to 30 mm, a glass wall thickness of 0.6 to 1.5 mm, and a length $l_a$ from 500 to 3000 mm.

In another aspect, the invention relates to a use of a glass tube according to one of the previous embodiments for making a pharmaceutical container, wherein the pharmaceutical container preferably has a capacity from 1 to 150 ml, 2 to 40 ml, 3 to 30 ml, or 4 to 20 ml.

In one embodiment, the pharmaceutical container has a capacity of at least 1 ml, at least 2 ml, at least 3 ml, or at least 4 ml. In one embodiment, the pharmaceutical container has a capacity of 150 ml or less, 40 ml or less, 30 ml or less, 20 ml or less.

In one embodiment, a pharmaceutical container may be a glass vial, a glass ampoule, a glass cartridge or a glass syringe.

Process for the Production of a Glass Tube for Pharmaceutical Containers

In another aspect, the invention relates to a process for the production of a glass tube for pharmaceutical containers comprising the steps of: providing a glass melt comprising volatile components, such as e.g., borates, preferably melting a batch of raw materials yielding the oxides comprised in the glass melt; forming the glass melt into a glass tube, e.g., by drawing, the glass tube having an inner surface and an outer surface; forming the glass tube into a glass tube with a first end and a second end; forming the first end into a first closed end; reducing the condensation of volatile components, such as e.g., borates, at the inner surface of the glass tube; and optionally forming and/or sealing the second end into a second closed end.

In a further aspect, the invention relates to a process for the production of a glass tube for pharmaceutical containers comprising the steps of: providing a glass melt comprising volatile components, such as e.g., borates, preferably melting a batch of raw materials yielding the oxides comprised in the glass melt; forming the glass melt into a glass tube, e.g., by drawing, the glass tube having an inner surface and an outer surface; forming the glass tube into a glass tube with a first end and a second end by hot forming, wherein the first end is formed into a first closed end, and wherein the second end is formed into a second closed end; opening and/or removing the first closed end, optionally opening and/or removing the second closed end, wherein opening and/or removing the first closed end and/or the second closed end is performed by flame abscission or laser abscission, wherein opening and/or removing the first closed end and/or the second closed end is performed within less than 30 seconds after hot forming of the glass tube, preferably less than 20 seconds after hot forming of the glass tube; optionally reducing the condensation of volatile components, such as e.g., borates, at the inner surface of the glass tube; optionally forming and/or sealing the second end into a second closed end; and optionally forming and/or sealing the first end into a first closed end.

In a related aspect, the invention relates to a product obtainable or obtained by the process according to the invention.

In one embodiment of the process for the production of a glass tube for pharmaceutical containers, the step of providing a glass melt comprising volatile components comprises melting a batch of glass raw materials, the batch of glass raw materials comprising boric oxide, in a melting tank to form a glass melt, as well as heating the glass raw materials and/or the glass melt using at least one fuel burner.

In one embodiment of the process for the production of a glass tube for pharmaceutical containers, the step of forming the glass melt into a glass tube, e.g., by drawing, wherein the glass tube has an inner surface and an outer surface, comprises flowing the glass melt onto a Danner mandrel, wherein the Danner mandrel is rotating at a constant speed, and drawing the glass melt from the rotating Danner mandrel into a glass tube.

In one embodiment of the process for the production of a glass tube for pharmaceutical containers, the step of forming the glass tube into a glass tube with a first end and a second end may be performed by brittle fracture of the glass tube obtained from the molten and drawn glass melt. Brittle fracture may be understood as mechanical scribing and subsequently breaking the glass tube. Breaking may be achieved by thermal shock on the scribed area and/or by mechanical loading of the free end of the glass tube.

In one embodiment of the process for the production of a glass tube for pharmaceutical containers, the step of forming the first end into a first closed end may be performed by hot forming of the first end.

In one embodiment of the process for the production of a glass tube for pharmaceutical containers, the step of reducing the condensation of volatile components, such as e.g., borates, at the inner surface of the glass tube may be effected by establishing an excess pressure inside the formed glass tube with a first end and a second end with respect to the environment outside the formed glass tube. In one embodiment, the step of reducing the condensation of volatile components, such as e.g., borates, at the inner surface of the glass tube may be effected by establishing an excess or additional pressure of 1 kPa, 5 kPa, 10 kPa, 100 kPa, or 500 kPa, inside the formed glass tube with a first end and a second end with respect to the atmospheric environment outside the formed glass tube.

In one embodiment of the process, establishing an excess pressure inside the formed glass tube with a first end and a second end, with respect to the environment outside the formed glass tube, may be effected by placing solid carbon dioxide, also known as and referred to as dry ice, preferably in the form of one or more dry ice pellets, inside the formed glass tube with a first end and a second end.

In one embodiment of the process, placing solid carbon dioxide inside the formed glass tube in the form of one or more dry ice pellets may be accompanied by tilting the glass tube at an angle of between 10° and 60°, preferably at an angle of between 10° and 20°, with respect to a horizontal of the glass tube.

In one embodiment, dry ice pellets have a mass of 22 mg. In one embodiment, dry ice pellets have a mass of 15 to 30 mg.

In one embodiment of the process, an amount of dry ice pellets is placed inside the formed glass tube which after evaporation of the dry ice would fill a volume at 298 K which is equal or more than the inner volume of the formed glass tube.

In one embodiment of the process, establishing an excess pressure inside the formed glass tube with a first end and a second end, with respect to the environment outside the formed glass tube, may be effected by evaporating liquid nitrogen inside the formed glass tube with a first end and a second end.

In one embodiment of the process, establishing an excess pressure inside the formed glass tube with a first end and a second end, with respect to the environment outside the formed glass tube, may be effected by placing a reaction mixture inside the formed glass tube with a first end and a second end, reacting the reaction mixture and/or initiating the reaction of the reaction mixture and/or allowing the reaction mixture to react, wherein the reaction mixture releases a gas during reaction, such as a gas chosen from the list of $CO_2$, $N_2$, $O_2$ and/or $H_2$.

In one embodiment, the invention relates to a product obtainable or obtained by a process for the production of a glass tube for pharmaceutical containers comprising the steps of: providing a glass melt comprising volatile components, such as e.g., borates, preferably melting a batch of raw materials yielding the oxides comprised in the glass melt; forming the glass melt into a glass tube, e.g., by drawing, the glass tube having an inner surface and an outer surface; forming the glass tube into a glass tube with a first end and a second end, preferably by brittle fracture of the glass tube obtained from the molten and drawn glass melt; forming the first end into a first closed end, preferably by hot forming of the first end; and reducing the condensation of volatile components, such as e.g., borates, at the inner surface of the glass tube, wherein the reduction of the condensation of volatile components may be effected by establishing an excess pressure inside the formed glass, with respect to the environment outside the formed glass tube, tube by one of the following means: placing solid carbon dioxide, also known as and referred to as dry ice, preferably in the form of one or more dry ice pellets, inside the formed glass tube, evaporating liquid nitrogen inside the formed glass tube, placing a reaction mixture inside the formed glass tube, reacting the reaction mixture and/or initiating the reaction of the reaction mixture and/or allowing the reaction mixture to react, wherein the reaction mixture releases a gas during reaction, such as a gas chosen from the list of $CO_2$, $N_2$, $O_2$ and/or $H_2$.

In one embodiment of the process, the step of opening and/or removing the first closed end is performed by flame abscission or laser abscission within less than 30 seconds after hot forming of the glass tube.

In one embodiment of the process, the step of opening and/or removing the first closed end and the second closed end is performed by flame abscission or laser abscission within less than 30 seconds after hot forming of the glass tube.

In one embodiment of the process, flame abscission or laser abscission of the first closed end and/or the second closed end is performed within less than 30 seconds after hot forming of the glass tube.

In one embodiment of the process, laser abscission of the first closed end and/or the second closed end is performed within less than 20 seconds after hot forming of the glass tube.

Advantageously, the step of opening and/or removing a closed end by flame abscission or laser abscission within less than 30 seconds after hot forming of the glass tube provides for a reduction of the condensation of borates at the inner surface of the glass tube.

Due to flame abscission or laser abscission the glass tube is heated at the first closed end and/or at the second closed end which generates an excess pressure inside the glass tube, with respect to the environment outside the formed glass tube, which may assist reducing the condensation of volatile components, such as e.g., borates, at the inner surface of the glass tube.

In one embodiment of the process for the production of a glass tube for pharmaceutical containers, the process comprises an additional step of filtration of the blowing air. Advantageously, this step provides for additional reduction of condensates. Preferably, the process comprises an additional step of filtration, e.g., fine-filtration, of the blowing air. In one embodiment fine-filtration is carried out with filter element 1C121756 (Donaldson Company, Inc.), with the following specifications: efficiency of 99.99999% for 0.01 µm particles, and filter medium type borosilicate.

In one embodiment, the invention relates to a process for the production of a glass tube for pharmaceutical containers comprising the steps of: providing a glass melt comprising volatile components, such as e.g., borates, preferably melting a batch of raw materials yielding the oxides comprised in the glass melt; forming the glass melt into a glass tube, e.g., by drawing, the glass tube having an inner surface and an outer surface; c1.) forming the glass tube into a glass tube with a first end and a second end by hot forming, wherein the first end is formed into a first closed end, and wherein the second end is formed into a second closed end; opening and/or removing the first closed end, wherein opening and/or removing the first closed end is performed by laser abscission, wherein opening and/or removing the first closed end is performed within less than 30 seconds after hot forming of the glass tube; reducing the condensation of volatile components, such as e.g., borates, at the inner surface of the glass tube, wherein the reduction of the condensation of borates is effected by placing solid carbon dioxide, preferably in the form of dry ice pellets, inside the formed glass tube, and subsequently placing one dry ice pellet inside the formed glass tube in the vicinity of the second closed end; opening and/or removing the second closed end, wherein opening and/or removing the second closed end is performed by laser abscission, sealing the second end into a second closed end; and sealing the first end into a first closed end, wherein sealing the first end and sealing the second end comprises sealing with perforated foil, wherein the perforations in the foil have a circular diameter of 10 inn or less, wherein the foil has at least 100 perforations per 1 $cm^2$.

It is advantageous to seal the first end and/or the second end with perforated foil, because in subsequent processes flame burners can be used to further process the glass tube. Also, the perforated foil can be kept for long time, and even allows further manufacturing steps under clean-room conditions while the perforated foil is present.

In one embodiment, the invention relates to a process for the production of a glass tube for pharmaceutical containers comprising the steps of: providing a glass melt comprising volatile components, such as e.g., borates, preferably melting a batch of raw materials yielding the oxides comprised in the glass melt; forming the glass melt into a glass tube, e.g., by drawing, the glass tube having an inner surface and an outer surface; forming the glass tube into a glass tube with a first end and a second end by hot forming, wherein the first end is formed into a first closed end, and wherein the second end is formed into a second closed end; opening and/or removing the first closed end, wherein opening and/or removing the first closed end is performed by laser abscission, wherein opening and/or removing the first closed end is performed within less than 30 seconds after hot forming of the glass tube; reducing the condensation of volatile components, such as e.g., borates, at the inner surface of the glass tube, wherein the reduction of the condensation of borates is effected by placing solid carbon dioxide, preferably in the form of dry ice pellets, inside the formed glass tube, and subsequently placing further dry ice pellets inside the formed glass tube in the vicinity of the second closed end; sealing the first end into a first closed end, wherein sealing the first end comprises sealing with perforated foil, wherein the perforations in the foil have a diameter of 10 inn or less, wherein the foil has at least 100 perforations per 1 $cm^2$.

UV-VIS Transmittance

Figure 2:
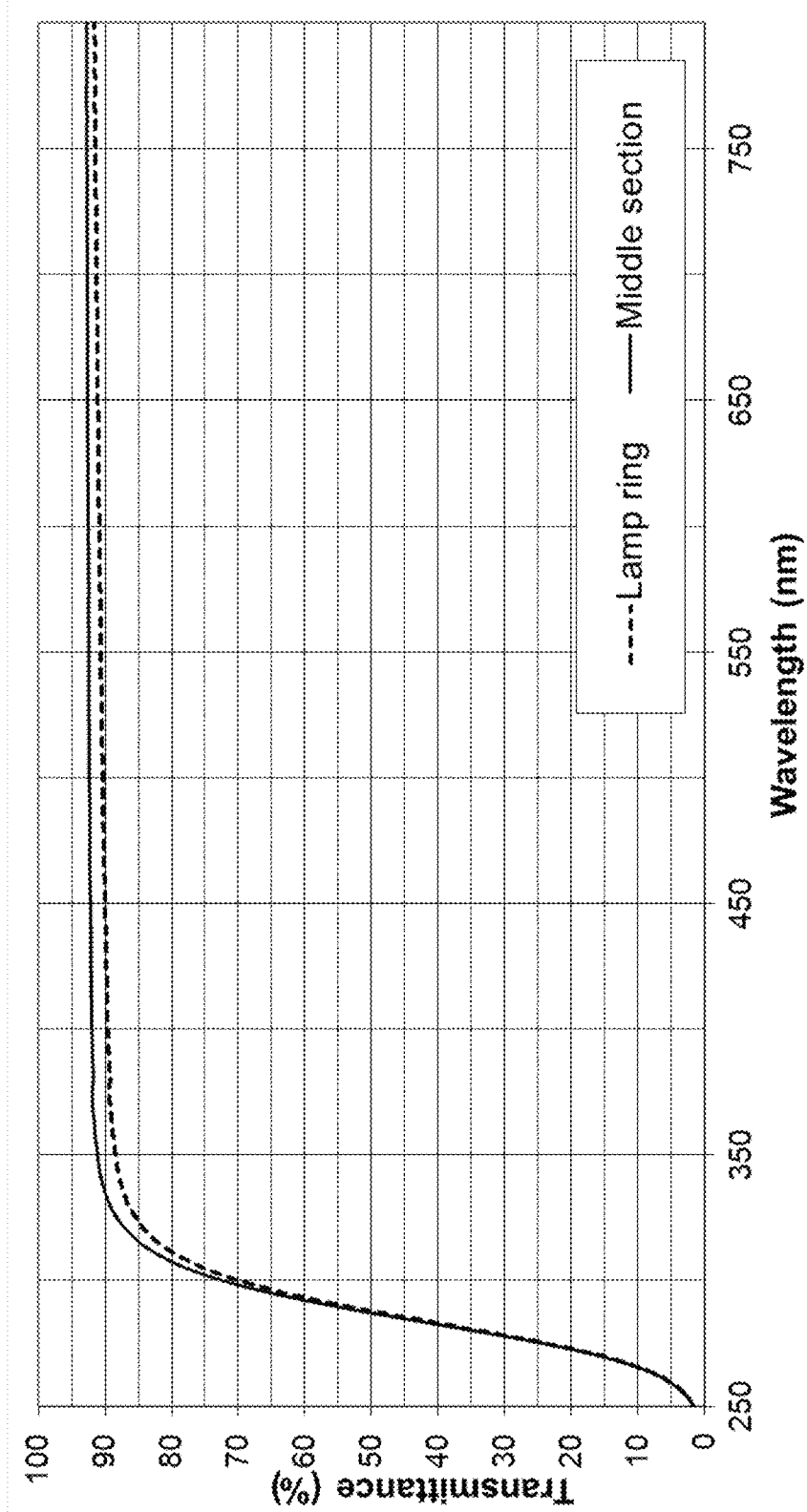
FIG. 2 shows transmittance spectra of a glass tube made of composition I, acquired on a lamp ring and at a location which is at half the length $l_a$ of the glass tube.
Figure 3:
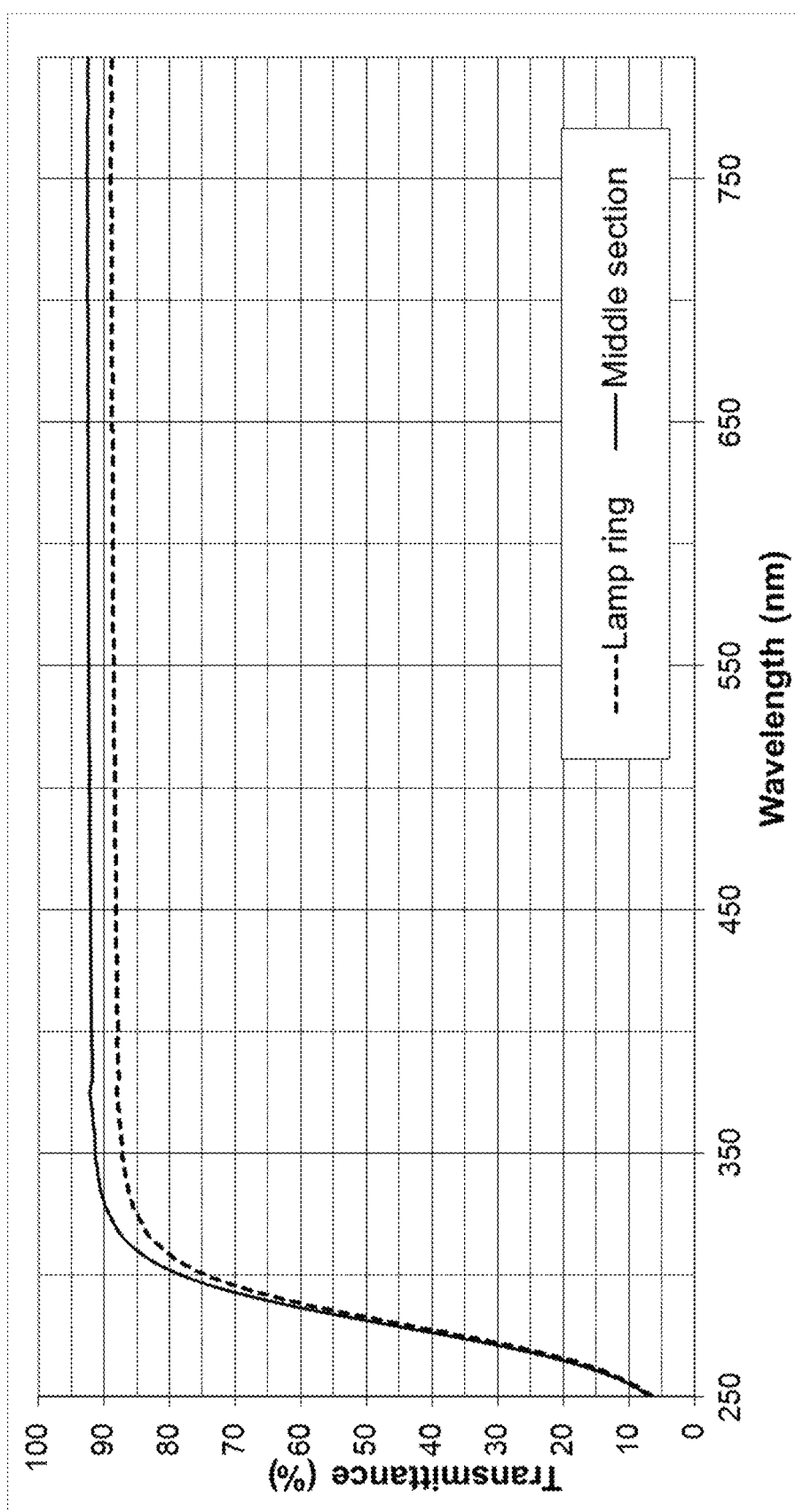
FIG. 3 shows transmittance spectra of a glass tube made of composition II, acquired on a lamp ring and at a location which is at half the length $l_a$ of the glass tube.

Referring now to FIGS. 2 and 3, the transmittance spectra of glass tubes of differing compositions are shown.

UV-VIS transmittance spectra have been acquired using the UV/VIS-Spectrometer Lambda 950, in the wavelength range from 250 nm to 2500 nm.

Two different types of glass tubes, based on different borosilicate glass compositions, have been measured.

UV-VIS transmittance spectra have been acquired on the lamp ring (in the first vicinity), i.e., in the area of the glass tube 1 at a distance of 1 cm from the hot formed closed ends 15, 25, and at a location which is at half the length $l_a$ of the glass tube.

Alkali Leachability

Figure 4:
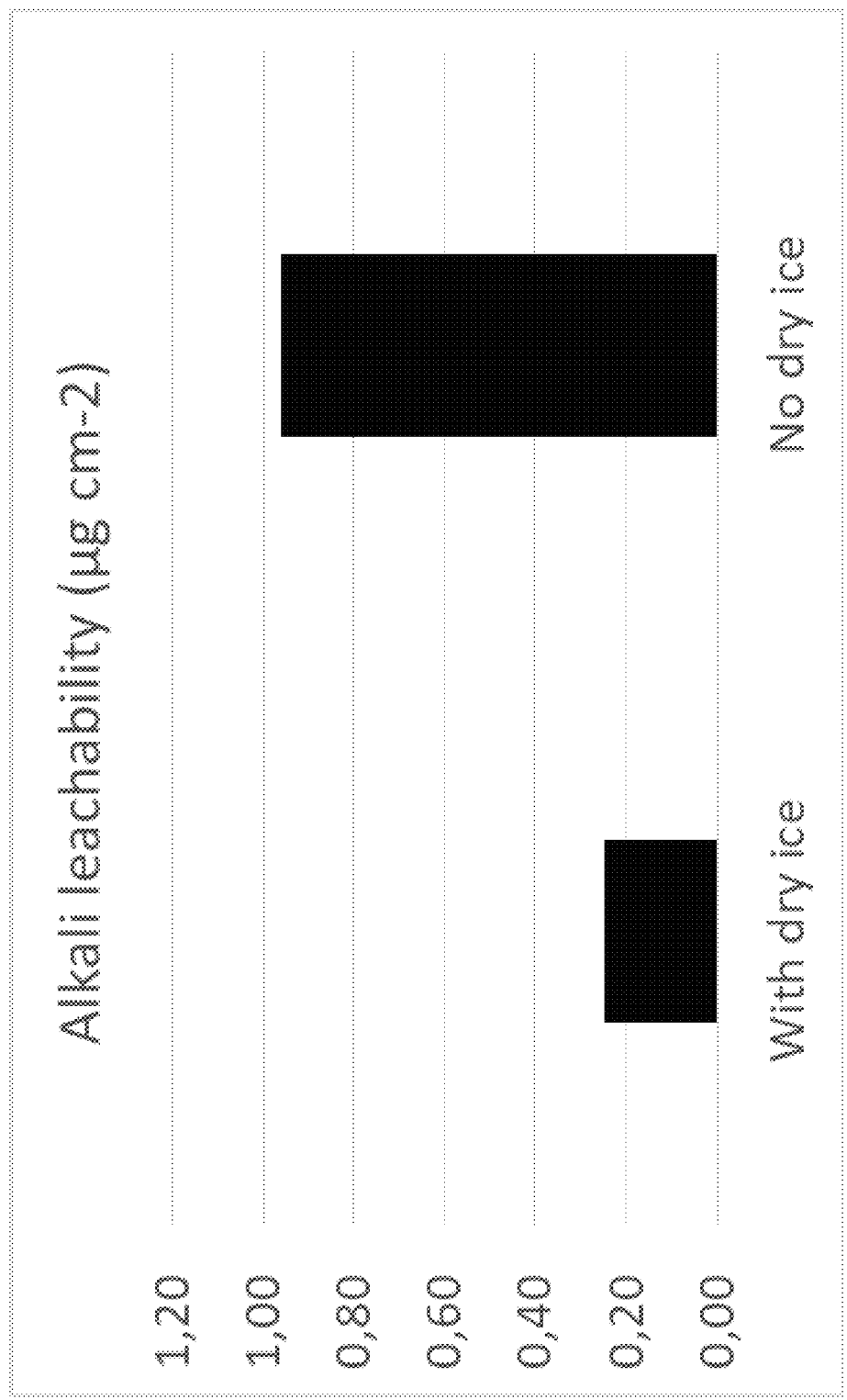
FIG. 4 shows the alkali leachability for the production of a glass tube for pharmaceutical containers in the presence of dry ice during the process, and in the absence of dry ice during the process (reference glass tube).

Referring now to FIG. 4, the alkali leachability for the production of a glass tube for pharmaceutical containers in the presence of dry ice during the process and in the absence of dry ice during the process (reference glass tube) are shown.

Here, a glass tube with an outer diameter of 29.5 mm and a wall thickness of 1.3 mm has been manufactured by drawing a glass melt. The test glass tube was cut in segments each having a length of around 150 mm. Subsequently, the first end was formed into a first closed end by hot forming at around 1200° C. An excess pressure inside the formed glass tube, with respect to the environment outside the formed glass tube, was established by placing dry ice pellets (not shown) inside the formed glass tube. A reference glass tube with the same dimensions has been manufactured without providing for an excess pressure inside the formed glass tube and without placing dry ice pellets inside the formed glass tube. To perform the alkali leachability test, the first closed end was discarded from the glass tubes by cutting, and by cutting out glass tube segments representing the first vicinity and the middle section, and, if applicable, the second vicinity. For each example—according to the invention and the reference glass tube—ten respective glass tube segments were investigated. The measured values are the average of the ten individual measurements.

The alkali leachability of the glass tube segments has been determined according to ISO 4802-2:2010, and is thus measured on the inner surface of the glass tube, except that the initial rinsing steps with distilled water at ambient temperature (Point 8.2 of the ISO Norm) are omitted. Referring to point 8.3 of ISO 4802-2:2010, each glass tube segment is capped from one open end, by definition referred to as the bottom end, with a silicone rubber plug. After filling with test water, the glass tube segment is capped at the other open end with aluminium foil. Before their first use, the silicone rubber plugs are cleaned, and the lack of alkali leachability from the silicone rubber plugs is confirmed. After each use the silicone rubber plugs are cleaned. The filling volume with distilled water is determined according to point 7.2.1 or point 7.2.2 of ISO 4802-2:2010 depending on the inner (or bore) diameter of the glass tube segment, i.e., $d_i \leq 20$ mm or $d_i > 20$ mm, respectively.

The alkali leachability is measured by determining the amount of alkali metal oxides and alkaline earth oxides in the extraction solution using flame atomic emission or absorption spectrometry (flame spectrometry). The alkali leachability is quantified in µg $Na_2O$ and normalised to the inner surface in $cm^2$ subjected to the test (cf. Point 1 a), 8.4 and 9.1 of ISO 4802-2:2010).

In the presence of dry ice during a process for the production of a glass tube for pharmaceutical containers, an alkali leachability of 0.25 µg $cm^{-2}$ was determined. In the absence of dry ice during a process for the production of a glass tube for pharmaceutical containers (reference glass tube), an alkali leachability of 0.96 µg $cm^{-2}$ was determined.

Estimation of the Necessary Amount of Dry Ice Pellets

The volume of the used dry ice pellets has been estimated to be 14.14 $mm^3$ which corresponds to a mass of 22 mg per dry ice pellet.

Based on a glass tube with an outer diameter of 30 mm, a wall thickness of 1 mm, and a length of 1500 mm, a necessary amount of 1.9 g dry ice has to be provided, in order to completely fill the inner volume of the glass tube, being 1215.26 $mm^3$, after sublimation of the dry ice.

REFERENCE NUMERALS

1 Glass tube
2 inner surface
3 outer surface
4 longitudinal axis
5 middle section
$d_i$ inner diameter
$d_o$ outer diameter
$l_a$ length
11 first end
12 first location
13 first intermediate location
14 first vicinity
15 first closed end
21 second end
22 second location
23 second intermediate location
24 second vicinity
25 second closed end

What is claimed is:

1. A glass tube for pharmaceutical containers, comprising:
an inner surface with an inner diameter ($d_i$) and an outer surface with an outer diameter ($d_o$);
a length ($l_a$) defined along a longitudinal axis between a first end and a second end, the length (la) being at least 125 mm, the first end is a first closed end and the second end is a second closed end;
a middle section spanning a distance of five times the inner diameter ($d_i$), the middle section being centred around the position of one half of the length ($l_a$);
a first location at a distance of 15 mm from the first end;
a second location at a distance of 15 mm from the second end;
a first intermediate location offset from the first end by a distance that is between ten times the inner diameter ($d_i$) and at most 75 mm;
a second intermediate location offset from the second end by a distance that is between ten times the inner diameter ($d_i$) and at most 75 mm;
a first vicinity between the first location and the first intermediate location, the first vicinity being devoid of a first lamp ring;
a pressure compensation vent hole passing from the inner surface to the outer surface at the first vicinity and/or the second vicinity;
a ratio of transmittance for at least one wavelength in a range of 350 to 800 nm for the first vicinity and the middle section is at least 0.97,
wherein the first vicinity has a first hydrolytic resistance characterized by a first alkali leachability and the middle section has a middle hydrolytic resistance characterized by a middle alkali leachability, wherein the first and middle alkali leachabilities are determined as relative concentration in an eluate prepared according to ISO 4802-2:2010, except that initial rinsing steps with distilled water at ambient temperature are omitted,
wherein the first alkali leachability is less than 0.9 µg $cm^{-2}$, and
wherein a ratio of the first and middle alkali leachabilities is between 0.5 and 2.0.

2. The glass tube of claim 1, wherein the ratio of transmittance is over an entirety of the range of 350 to 800 nm.

3. The glass tube of claim 1, wherein the ratio of transmittance is at least 0.99.

4. The glass tube of claim 1, wherein the first alkali leachability is less than 0.7 µg cm$^{-2}$.

5. The glass tube of claim 1, wherein the first alkali leachability is less than 0.5 µg cm$^{-2}$.

6. The glass tube of claim 1, further comprising a difference of the first alkali leachability of less than 0.3 µg cm$^{-2}$ between the ISO 4802-2:2010 method performed with the initial rinsing steps with distilled water at ambient temperature and the ISO 4802-2:2010 method performed without the initial rinsing steps.

7. The glass tube of claim 1, wherein the ratio of the first and middle alkali leachabilities is between 0.9 and 1.1.

8. The glass tube of claim 1, wherein the ratio of the first and middle alkali leachabilities is between 0.99 and 1.01.

9. The glass tube of claim 1, wherein the middle alkali leachability is less than 0.4 µg cm$^{-2}$.

10. The glass tube of claim 1, wherein the middle alkali leachability is less than 0.25 µg cm$^{-2}$.

11. The glass tube of claim 1, comprising a glass composition, wherein the glass composition comprises a fining agent selected from a group consisting of a chloride, a sulfate, and combinations thereof.

12. The glass tube of claim 1, comprising a glass composition selected from a group consisting of soda-lime glass, borosilicate glass, aluminosilicate glass, and glass comprising from 5 mol % to 20 mol % boric oxide based on all oxides present in the glass composition.

13. The glass tube of claim 1, comprising a glass composition comprising 60 to 85 mol % $SiO_2$, 5 to 20 mol % $B_2O_3$, 2 to 10 mol % $Al_2O_3$, 0 to 2 mol % $Fe_2O_3$, 2 to 10 mol % $Na_2O$, 0 to 5 mol % $K_2O$, 0 to 2 mol % BaO, 0 to 2 mol % CaO, and 0 to 10 mol % $TiO_2$, based on all oxides present in the glass composition.

14. The glass tube of claim 1, wherein the glass tube has a feature selected from a group consisting of: the inner diameter ($d_i$) from 5.0 to 49.0 mm, the inner diameter ($d_i$) from 9.0 to 26 mm, the outer diameter ($d_o$) from 6.0 to 50 mm, the outer diameter ($d_o$) from 8.0 to 30 mm, a wall thickness between the inner diameter ($d_i$) and the outer diameter ($d_o$) from 6.0 to 50 mm, the wall thickness of 0.5 to 2.0 mm, the wall thickness of 0.6 to 1.5 mm, the length ($l_a$) from 125 to 5000 mm, the length ($l_a$) from 500 to 3000 mm, the length ($l_a$) from 1000 to 2000 mm, and any combinations thereof.

15. The glass tube of claim 1, wherein the first closed end is a flat-bottom.

16. The glass tube of claim 1, wherein the second closed end is a flat-bottom.

17. The glass tube of claim 1, further comprising a second vicinity between the second location and the second intermediate location, the second vicinity being devoid of a second lamp ring.

18. The glass tube of claim 17, further comprising a feature selected from a group consisting of:
   a ratio of transmittance for at least one wavelength in a range of 350 to 800 nm for the second vicinity and the middle section is at least 0.97;
   a ratio of transmittance for at least one wavelength in a range of 350 to 800 nm for the second vicinity and the middle section is at least 0.99;
   a ratio of transmittance over an entirety of wavelengths in a range of 350 to 800 nm for the second vicinity and the middle section is at least 0.97;
   a ratio of transmittance over an entirety of wavelengths in a range of 350 to 800 nm for the second vicinity and the middle section is at least 0.99;
   a second hydrolytic resistance of the second vicinity that is characterized by a second alkali leachability determined as relative concentration in an eluate prepared according to ISO 4802-2:2010, except that initial rinsing steps with distilled water at ambient temperature are omitted, the second alkali leachability being less than 0.9 µg cm$^{-2}$;
   a ratio of the second and middle alkali leachabilities between 0.5 and 2.0;
   a ratio of the second and middle alkali leachabilities between 0.9 and 1.1;
   a ratio of the second and middle alkali leachabilities between 0.99 and 1.01; and
   any combinations thereof.

19. The glass tube of claim 18, further comprising a difference of the first alkali leachability of less than 0.3 µg cm$^{-2}$ between the ISO 4802-2:2010 method performed with the initial rinsing steps with distilled water at ambient temperature and the ISO 4802-2:2010 method performed without the initial rinsing steps.

20. The glass tube of claim 1, wherein the length ($l_a$) is at most 5000 mm.

21. The glass tube of claim 1, wherein the glass composition is borosilicate glass.

* * * * *